(12) United States Patent
Nakamura et al.

(10) Patent No.: US 11,149,368 B2
(45) Date of Patent: Oct. 19, 2021

(54) SEWING MACHINE AND RECORDING MEDIUM

(71) Applicant: JANOME SEWING MACHINE CO., LTD., Tokyo (JP)

(72) Inventors: Haruka Nakamura, Tokyo (JP); Kentaro Akahane, Tokyo (JP); Hideo Suzuki, Tokyo (JP); Ayako Harada, Tokyo (JP)

(73) Assignee: JANOME SEWING MACHINE CO., LTD., Tokyo (JP)

( * ) Notice: Subject to any disclaimer, the term of this patent is extended or adjusted under 35 U.S.C. 154(b) by 238 days.

(21) Appl. No.: 16/684,346

(22) Filed: Nov. 14, 2019

(65) Prior Publication Data

US 2020/0208316 A1 Jul. 2, 2020

(30) Foreign Application Priority Data

Dec. 28, 2018 (JP) .............................. JP2018-246435

(51) Int. Cl.
*D05B 21/00* (2006.01)
*D05B 19/12* (2006.01)

(52) U.S. Cl.
CPC .............. *D05B 21/00* (2013.01); *D05B 19/12* (2013.01); *D05D 2205/085* (2013.01); *G05B 2219/2626* (2013.01)

(58) Field of Classification Search
CPC ........ D05B 21/00; D05B 19/08; D05B 19/10; D05B 19/12–16; G05B 2219/2626

USPC .................................................. 700/136–138
See application file for complete search history.

(56) References Cited

U.S. PATENT DOCUMENTS

| | | | | |
|---|---|---|---|---|
| 4,660,483 A | * | 4/1987 | Yamauchi | D05B 69/22 112/317 |
| 5,078,068 A | * | 1/1992 | Hager | D05B 69/20 112/475.01 |
| 5,153,840 A | * | 10/1992 | Shigeta | D05B 19/10 700/137 |

FOREIGN PATENT DOCUMENTS

JP    2009-240600 A    10/2009

* cited by examiner

*Primary Examiner* — Nathan E Durham
(74) *Attorney, Agent, or Firm* — Nakanishi IP Associates, LLC (57) ABSTRACT

A sewing machine includes a feed amount setting part and a feed amount adjustment part. In the feed amount setting part, a forward feed amount for one stitch of forward stitching is set. In the feed amount adjustment part, the forward feed amount which is set by the feed amount setting part is compared with the maximum backward feed amount for one stitch of reverse stitching which is determined by a feed mechanism. Then, in the feed amount adjustment part, when the forward feed amount is larger than the maximum backward feed amount, the total amount of backward feed amounts for plural stitches of backward stitching is adjusted so as to coincide with the total amount of the forward feed amounts for one stitch or more of forward stitching.

7 Claims, 5 Drawing Sheets

SEWING MACHINE AND RECORDING MEDIUM

CROSS REFERENCE TO RELATED APPLICATION

This application is based on and claims the benefit of priority to Japanese Patent Application No. 2018-246435 filed on Dec. 28, 2018, the contents of which are hereby incorporated by reference in their entirety.

TECHNICAL FIELD

The present invention relates to a sewing machine and a recording medium, and in particular to a sewing machine and a computer-readable recording medium in which a reverse stitching control program for the sewing machine is recorded.

RELATED ART

JP-A-2009-240600 discloses a reverse stitching control device of a sewing machine. In this reverse stitching control device, each of initial automatic reverse stitching control and soft start control is executed. In the initial automatic reverse stitching control, a reverse stitching solenoid is driven with the number of reverse stitches set in advance, and thus reverse stitching which reverses a feed direction of a feed dog from forward feed to reverse feed is performed before normal sewing. In the soft start control, at the time of start of sewing in the sewing machine, sewing with the number of soft start stitches set in advance is performed at a soft start sewing speed which is slower than the normal sewing speed.

If the reverse stitching of a straight pattern or a zigzag pattern is executed in the sewing machine, it is possible to perform sewing that also serves as a strong fraying stopper.

Incidentally, according to the mechanical structure of a feed mechanism of the sewing machine, there is a case where the maximum backward feed amount for one stitch which performs reverse stitching does not coincide with the maximum forward feed amount for one stitch which performs normal sewing. For example, in a case where the maximum backward feed amount is smaller than the maximum forward feed amount, if the forward feed amount is larger than the maximum backward feed amount, misalignment occurs between the stitch of the forward stitching and the stitch of the reverse stitching. For this reason, the appearance of sewing is bad, and thus there is room for improvement.

Here, the forward feed amount can be adjusted within the range of the maximum backward feed amount. However, the stitch of the forward stitching becomes smaller, and thus usability as a sewing machine is bad, and the performance of the sewing machine is limited.

SUMMARY OF INVENTION

The present invention has been made in view of the above facts and provides a sewing machine capable of improving the appearance of reverse stitching, and a computer-readable recording medium in which a reverse stitching control program is recorded.

A sewing machine according to a first embodiment of the present invention includes a feed amount setting part which sets a forward feed amount for one stitch of forward stitching, and a feed amount adjustment part which compares the forward feed amount which is set by the feed amount setting part with a maximum backward feed amount for one stitch of reverse stitching which is determined by a feed mechanism, and adjusts a total amount of backward feed amounts for plural stitches so as to coincide with a total amount of the forward feed amounts for one stitch or more, when the forward feed amount is larger than the maximum backward feed amount.

In a sewing machine according to a second embodiment of the present invention, in the sewing machine according to the first embodiment, the feed amount adjustment part adjusts the total amount of the backward feed amounts for plural stitches so as to coincide with the forward feed amount for one stitch.

In a sewing machine according to a third embodiment of the present invention, in the sewing machine according to the first or second embodiment, the feed amount adjustment part sets the respective backward feed amounts in the total amount of the backward feed amounts for plural stitches at equal intervals.

In a sewing machine according to a fourth embodiment of the present invention, in the sewing machine according to the first or second embodiment, the feed amount adjustment part sets the respective backward feed amounts in the total amount of the backward feed amounts for plural stitches at unequal intervals.

In a sewing machine according to a fifth embodiment of the present invention, in the sewing machine according to any one of the first to fourth embodiments, the feed amount adjustment part does not form a stitch for a part of the number of stitches in the total amount of the backward feed amounts for plural stitches.

In a sewing machine according to a sixth embodiment of the present invention, the sewing machine according to any one of the first to fifth embodiments further includes a reverse stitching instruction part which gives an instruction on the reverse stitching, in which reverse stitching of the total amount of the backward feed amounts for plural stitches which is adjusted in the feed amount adjustment part is performed in accordance with an instruction from the reverse stitching instruction part.

A recording medium according to a seventh embodiment of the present invention is a non-transitory computer-readable recording medium in which a reverse stitching control program for causing a computer to execute a reverse stitching control method for a sewing machine including a feed amount setting part and a feed amount adjustment part is recorded, in which the control program recorded in the recording medium includes a process in which the feed amount setting part sets a forward feed amount for one stitch of forward stitching, and a process in which the feed amount adjustment part compares the forward feed amount which is set by the feed amount setting part with a maximum backward feed amount for one stitch of reverse stitching which is determined by a feed mechanism, and adjusts a total amount of backward feed amounts for plural stitches so as to coincide with a total amount of the forward feed amounts for one stitch or more, when the forward feed amount is larger than the maximum backward feed amount.

One or more of the above embodiments may provide a sewing machine capable of improving the appearance of reverse stitching, and a recording medium in which a reverse stitching control program for causing a computer to execute a reverse stitching control method for the sewing machine is recorded.

DESCRIPTION OF EMBODIMENTS

First Embodiment

Hereinafter, a sewing machine and a reverse stitching control program according to a first embodiment of the present invention will be described with reference to FIGS. 1 to 4.

(Configuration of Sewing Machine 1)

Figure 1:
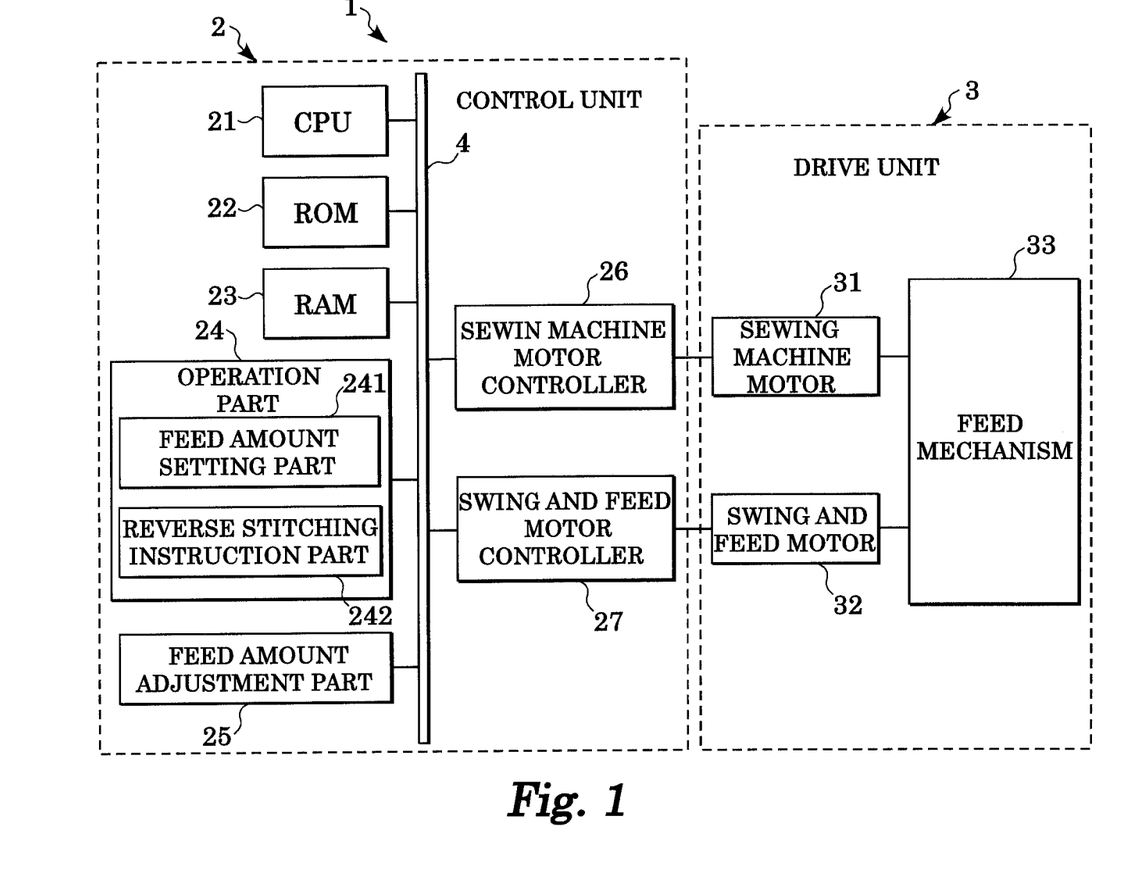
FIG. 1 is a block configuration diagram of a part of a sewing machine according to a first embodiment of the present invention.

As shown in FIG. 1, a sewing machine 1 according to this embodiment is configured to include a control unit 2 and a drive unit 3.

The control unit 2 includes a central arithmetic processing unit (CPU) 21, a non-volatile memory (ROM: Read Only Memory) 22, a volatile memory (RAM: Random Access Memory) 23, an operation part 24, and a feed amount adjustment part 25. Further, the control unit 2 includes a sewing machine motor controller 26 and a swing and feed motor controller 27. The respective constituent elements such as the central arithmetic processing unit 21 of the control unit 2 are connected to each other through a common bus 4.

On the other hand, the drive unit 3 is configured to include a sewing machine motor 31, a swing and feed motor 32, and a feed mechanism 33.

The central arithmetic processing unit 21 is incorporated in the control unit 2 as a computer which controls the overall operation of the sewing machine 1 in accordance with a control program. The control program is stored in the non-volatile memory 22, and in this embodiment, the reverse stitching control program is further stored in the non-volatile memory 22. Processing information executed by the central arithmetic processing unit 21 is temporarily stored in the volatile memory 23, and various programs other than the control program or other processing information is stored in the volatile memory 23.

The operation part 24 is configured to include, for example, a touch panel, and is configured as an input device for operating the sewing machine 1 or as an output device for displaying an operation content or a processing content. The operation part 24 further includes a feed amount setting part 241 and a reverse stitching instruction part 242.

In the feed amount setting part 241, it is possible to set a forward feed amount for one stitch of forward stitching of sewing work. By a user's operation, in the feed amount setting part 241, it is possible to set the forward feed amount within the range up to the maximum forward feed amount, for example, the range up to 5 mm.

In the reverse stitching instruction part 242, by a user's operation, it is possible to give an instruction on the reverse stitching of the sewing work. If the instruction on the reverse stitching is given, the sewing machine 1 is switched to backward stitching.

In the feed amount adjustment part 25, the forward feed amount of the forward stitching which is set by the feed amount setting part 241 is compared with the maximum backward feed amount for one stitch of the reverse stitching. The maximum backward feed amount for one stitch is determined by the mechanical structure of the feed mechanism 33 of the drive unit 3. In this embodiment, the maximum backward feed amount for one stitch is smaller than the maximum forward feed amount for one stitch of the forward stitching and is, for example, 4 mm, and it is possible to set the backward feed amount of the backward stitching within the range up to the maximum backward feed amount.

Further, in the feed amount adjustment part 25, when the forward feed amount for one stitch which is set by the feed amount setting part 241 is larger than the maximum backward feed amount for one stitch, it is possible to adjust the total amount of the backward feed amounts for plural stitches so as to coincide with the total amount of the forward feed amounts for one stitch or more. An adjustment method by the feed amount adjustment part 25 will be described in detail.

Figure 2A:
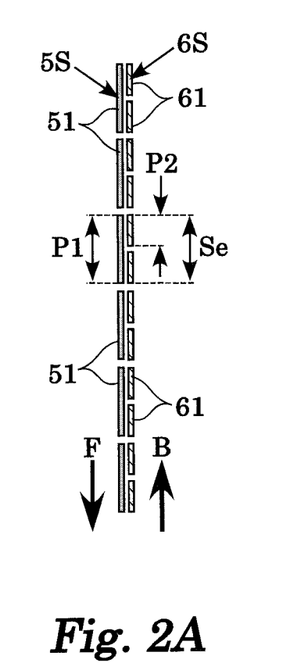
FIG. 2A is a plan view schematically showing stitches of forward straight stitching and stitches of backward straight stitching sewn using the sewing machine according to the first embodiment.

FIG. 2A shows a schematic diagram showing forward straight stitching 5S and backward straight stitching 6S which is reverse stitching and is arranged on the right side of the forward straight stitching 5S for convenience, as viewed from above. The forward straight stitching 5S and the backward straight stitching 6S actually overlap up and down. However, in order to help understanding of the embodiment, the forward straight stitching 5S and the backward straight stitching 6S are shown to be intentionally arranged side by side. The forward straight stitching 5S is formed by disposing a plurality of stitches 51, each of which is for one stitch P1, at regular intervals in a forward stitching direction F. The forward feed amount equivalent to the stitch 51 for one stitch P1 is set in the feed amount setting part 241.

In the feed amount adjustment part 25, whether or not the forward feed amount equivalent to the stitch 51 for one stitch P1 is larger than the maximum backward feed amount for one stitch is compared and determined. When it is determined that the forward feed amount is larger than the maximum backward feed amount, in the feed amount adjustment part 25, the total amount of the backward feed amounts for plural stitches is adjusted so as to coincide with the total amount of the forward feed amounts for one stitch P1 or more.

Here, stitches 61 each having the length of one stitch P2 corresponding to substantially a half of the length in the forward stitching direction F of the stitch 51 for one stitch P1 are disposed at regular intervals in a backward stitching direction B. The total amount of the forward feed amount equivalent to the stitch 51 for one stitch P1 coincides with the total amount of the backward feed amounts equivalent to the stitches 61 for two stitches P2 (the stitches 61 for two stitches).

That is, in the feed amount adjustment part 25, the backward feed amount is adjusted within the range of the maximum backward feed amount so as to coincide with the total amount of the forward feed amount equivalent to the stitch 51 for one stitch P1 and become the backward feed amount equivalent to the stitches 61 for a plurality of stitches P2. In other words, the backward feed amount is adjusted with the backward feed amounts equivalent to the stitches 61 for a plurality of stitches P2, which coincides with the total amount of the forward feed amount equivalent to the stitch 51 for one stitch P1, as one set Se.

Further, in the feed amount adjustment part 25, the respective backward feed amounts each equivalent to the stitch 61 for one stitch P2, in the total amount of the backward feed amounts equivalent to the stitches 61 for a plurality of stitch P2, for example, one set Se, are adjusted at equal intervals.

Figure 2B:
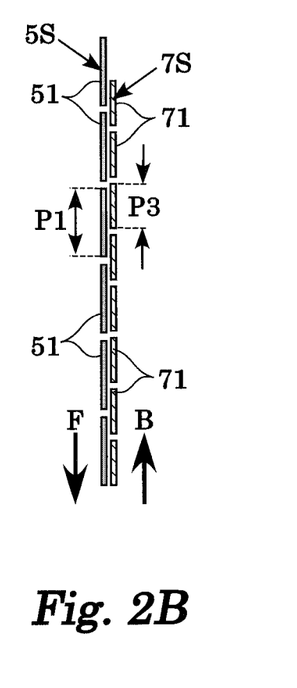
FIG. 2B is a plan view corresponding to FIG. 2A, showing a comparative example.

FIG. 2B shows a schematic diagram corresponding to FIG. 2A, showing a forward straight stitching 5S and a backward straight stitching 7S formed by a sewing machine according to a comparative example which does not have the feed amount adjustment part 25 in this embodiment, as viewed from above. The forward straight stitching 5S is formed by disposing a plurality of stitches 51, each of which is for one stitch P1, at regular intervals in the forward stitching direction F, similar to the above description.

On the other hand, the backward straight stitching 7S is formed by disposing a plurality of stitches 71, each of which is for one stitch P3 equivalent to the maximum backward feed amount, at regular intervals in the backward stitching direction B.

The stitch 71 of the backward straight stitching 7S formed by the sewing machine according to the comparative example does not coincide with the stitch 51 of the forward straight stitching 5S.

Figure 3A:
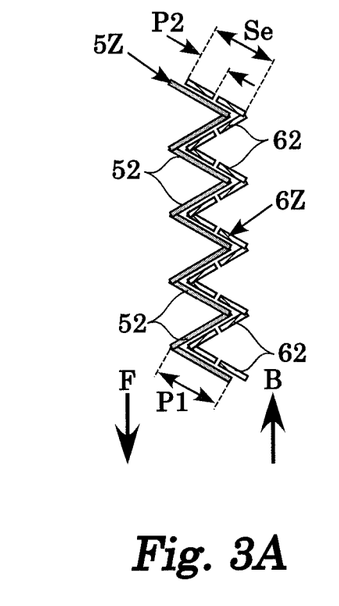
FIG. 3A is a plan view schematically showing stitches of forward zigzag stitching and stitches of backward zigzag stitching sewn using the sewing machine according to the first embodiment.

Further, FIG. 3A shows a schematic diagram corresponding to FIG. 2A, showing forward zigzag stitching 5Z and backward zigzag stitching 6Z which is the reverse stitching, as viewed from above. The forward zigzag stitching 5Z is formed by disposing a plurality of stitches 52, each of which is for one stitch P1 for each of right and left turns at a constant swing, in the forward stitching direction F. The forward feed amount of the stitch 52 for one stitch P1 is set in the feed amount setting part 241.

In the feed amount adjustment part 25, whether or not the forward feed amount equivalent to the stitch 52 for one stitch P1 is larger than the maximum backward feed amount for one stitch is compared and determined. When it is determined that the forward feed amount is larger than the maximum backward feed amount, in the feed amount adjustment part 25, the total amount of the backward feed amounts for plural stitches is adjusted so as to coincide with the total amount of the forward feed amounts for one stitch P1 or more.

Similar to the backward straight stitching 6S described above, the stitches 62 each having the length of one stitch P2 corresponding to substantially a half of the length in the direction inclined with respect to the forward stitching direction F of the stitch 52 for one stitch P1 are disposed at regular intervals in the direction inclined with respect to the backward stitching direction B. The total amount of the forward feed amount equivalent to the stitch 52 for one stitch P1 coincides with the total amount of the backward feed amounts equivalent to the stitches 62 for two stitches P2 (the stitches 62 for two stitches).

That is, in the feed amount adjustment part 25, the backward feed amount is adjusted within the range of the maximum backward feed amount so as to coincide with the total amount of the forward feed amount equivalent to the stitch 52 for one stitch P1 and become the backward feed amount equivalent to the stitches 62 for a plurality of stitches P2. Here too, the backward feed amount is adjusted with the backward feed amounts equivalent to the stitches 62 for a plurality of stitches P2, which coincides with the total amount of the forward feed amount equivalent to the stitch 52 for one stitch P1, as one set Se.

Figure 3B:
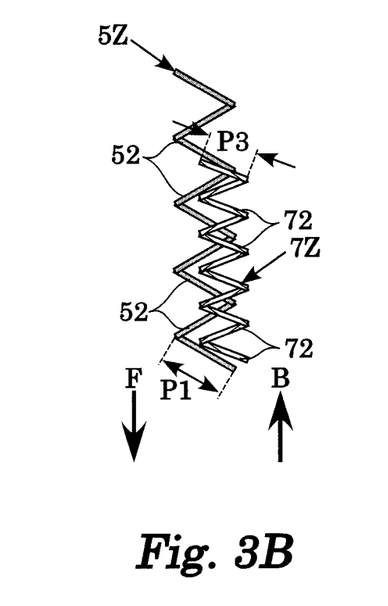
FIG. 3B is a plan view corresponding to FIG. 3A, showing a comparative example.

FIG. 3B shows a schematic diagram corresponding to FIG. 3A, showing forward zigzag stitching 5Z and backward zigzag stitching 7Z formed by a sewing machine according to a comparative example which does not have the feed amount adjustment part 25 in this embodiment, as viewed from above. The forward zigzag stitching 5Z is formed by disposing a plurality of stitches 52, each of which is for one stitch P1 for each of right and left turns at a constant swing, in the forward stitching direction F, similar to the above description.

On the other hand, the backward zigzag stitching 7Z is formed by disposing a plurality of stitches 72, each of which is for one stitch P3 equivalent to the maximum backward feed amount, for each of right and left turns at a constant swing, in the backward stitching direction B.

The stitch 72 of the backward zigzag stitching 7Z formed by the sewing machine according to the comparative example does not coincide with the stitch 52 of the forward zigzag stitching 5Z.

Returning to FIG. 1, the sewing machine motor controller 26 rotationally drives the sewing machine motor 31 of the drive unit 3, based on a command from the central arithmetic processing unit 21. If the sewing machine motor 31 is rotationally driven, a needle bar (not shown) is driven up and down through the feed mechanism 33.

Similarly, the swing and feed motor controller 27 rotationally drives the swing and feed motor 32, based on a command from the central arithmetic processing unit 21. If the swing motor of the swing and feed motor 32 is rotationally driven, a needle bar (not shown) can be swung to right and left through the feed mechanism 33. Further, if the feed motor of the swing and feed motor 32 is rotationally driven, the forward feed or the backward feed of an object to be sewed, such as cloth or leather, can be performed through the feed mechanism 33.

Each of the forward straight stitching 5S and the backward straight stitching 6S shown in FIG. 2A is performed by the rotational drive of the sewing machine motor 31 and the rotational drive of the feed motor of the swing and feed motor 32. Further, each of the forward zigzag stitching 5Z and the backward zigzag stitching 6Z shown in FIG. 3A is performed by the rotational drive of the sewing machine motor 31, and the rotational drive of the feed motor and the rotational drive of the swing motor of the swing and feed motor 32.

(Reverse Stitching Control Method and Reverse Stitching Control Program)

Next, a reverse stitching control method and a reverse stitching control program of the sewing machine 1 according to this embodiment will be described using FIG. 4 while referring to FIG. 1.

Here, the reverse stitching control method which is described below is executed using the central arithmetic processing unit 21 shown in FIG. 1 as a computer, based on the reverse stitching control program stored (retained) before or after the sewing machine 1 is shipped as a product. The control program is stored in the non-volatile memory 22 or the volatile memory 23.

Further, here, the reverse stitching control method for forming the backward straight stitching 6S with respect to the forward straight stitching 5S shown in FIG. 2A will be described. The reverse stitching control method for forming the backward zigzag stitching 6Z with respect to the forward zigzag stitching 5Z shown in FIG. 3B is substantially the same as the reverse stitching control method for forming the backward straight stitching 6S with respect to the forward straight stitching 5S, and therefore, description thereof is omitted.

Figure 4:
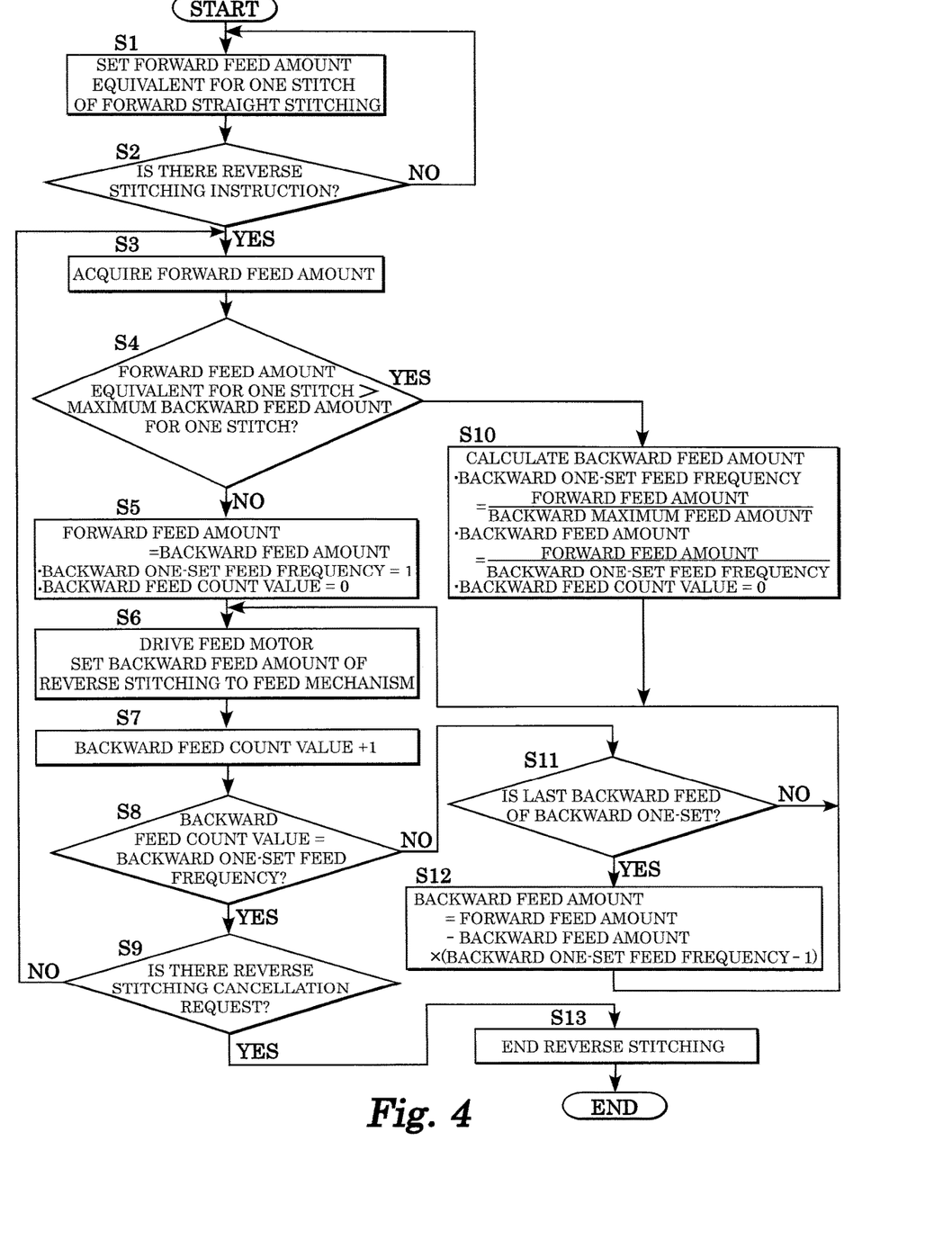
FIG. 4 is a flowchart for explaining a reverse stitching control method of the sewing machine according to the first embodiment.

As shown in FIG. 4, the reverse stitching control method is started. First, in the control unit 2 of the sewing machine 1, the forward feed amount equivalent to the stitch 51 (refer to FIG. 2A) for one stitch P1 of the forward straight stitching 5S is set to the feed amount setting part 241 (refer to FIG. 1) of the operation part 24 (step S1).

In a case where a user selects the reverse stitching, the user operates the reverse stitching instruction part 242 (refer to FIG. 1) of the operation part 24. Here, in the control unit 2, whether or not there is a reverse stitching instruction is determined (step S2). When it is determined that there is no reverse stitching instruction, the routine returns to step S1.

On the other hand, when it is determined that there is the reverse stitching instruction, the forward feed amount set in step S1 is acquired in the feed amount adjustment part 25 shown in FIG. 1 (step S3). In the feed amount adjustment part 25, the acquired forward feed amount equivalent to the stitch 51 for one stitch P1 is compared with the maximum backward feed amount equivalent to the stitch for one stitch which is determined by the feed mechanism 33 of the sewing machine 1, and whether or not the forward feed amount is larger than the maximum backward feed amount is determined (step S4).

In step S4, when it is determined that the forward feed amount is within the range of the maximum backward feed amount, that is, the forward feed amount is the same as or smaller than the maximum backward feed amount, the forward feed amount and the backward feed amount are set to the same value (step S5). At this time, in the feed amount adjustment part 25, a "backward one-set feed frequency" is set to "1" and a "backward feed count value" is set to "0".

The feed amount adjustment part 25 rotationally drives the feed motor (stepping motor) of the swing and feed motor 32 through the swing and feed motor controller 27, based on the determination result, and the backward feed amount of the reverse stitching is set to the feed mechanism 33 (refer to FIG. 1) (step S6).

At this time, in the feed amount adjustment part 25, "1" is added to the "backward feed count value" (step S7).

Then, if the backward feed amount is set, the reverse stitching is executed (refer to the backward straight stitching 6S shown in FIG. 2A.

If the reverse stitching is executed, whether or not the reverse stitching of a backward one-set has been completed is determined (step S8). When the "backward feed count value" is equal to the "backward one-set feed frequency", it is determined that "it has been completed", and when the "backward feed count value" is not equal to the "backward one-set feed frequency", it is determined that "it has not been completed".

If it is determined that "it has been completed", whether or not there is a reverse stitching cancellation request is determined (step S9). If it is determined that there is the cancellation request, the reverse stitching is ended (step S13), and the reverse stitching control method of the sewing machine 1 according to this embodiment is ended. Here, the execution of the reverse stitching is continued until the cancellation request is given. On the other hand, if it is determined that "it has not been completed", the routine returns to step S3.

In step S4 described above, when it is determined that the forward feed amount is larger than the maximum backward feed amount, in the feed amount adjustment part 25, the backward feed amount of the reverse stitching is calculated (step S10). The following expression <1> and expression <2> are used for the calculation of the backward feed amount.

Backward one-set feed frequency=forward feed amount÷backward maximum feed amount     <1>

Backward feed amount=forward feed amount÷backward feed one-set frequency     <2>

Further, at this time, in the feed amount adjustment part 25, the "backward feed count value" is set to "0".

In a case where the forward feed amount is set to 3.9 mm and the maximum backward feed amount is 2.5 mm, the backward one-set feed frequency is changed from "3.9 mm÷2.5 mm" to "1.56", based on the expression <1>. Since the calculated value is the "frequency", if the decimal part is rounded up or an integer is obtained by rounding-off, the backward one-set feed frequency becomes "2". The backward feed amount is changed from "3.9 mm÷2" to "1.95 mm", based on the expression <2>. Since sufficient sewing accuracy is obtained within the range up to the first decimal place, if the second decimal place is simply deleted, the backward feed amount becomes "1.9 mm".

If the backward feed amount is calculated and the "backward feed count value" is set to "0", the routing proceeds to step S6. The feed amount adjustment part 25 rotationally drives the feed motor of the swing and feed motor 32 through the swing and feed motor controller 27, based on the calculation result of the backward feed amount, and the backward feed amount of the reverse stitching is set to the feed mechanism 33 (refer to FIG. 1) (step S6).

If the backward feed amount is set, as shown in FIG. 2A, the backward straight stitching 6S is formed. The total amount of the backward feed amounts equivalent to the stitches 61 for a plurality of stitches P2 (the stitches P2 of one set Se) of the backward straight stitching 6S approximates to the total amount of the forward feed amount equivalent to the stitch 51 for one stitch P1 of the forward straight stitching 5S.

Thereafter, the processing of step S7 and the subsequent steps is executed.

In step S8 described above, if the reverse stitching is executed and it is determined that the reverse stitching of the backward one-set has not been completed, the formation of the backward straight stitching 6S is continued with the backward feed amount equivalent to the stitch 61 for one stitch P2.

Here, whether or not it is the last backward feed of the backward one-set is determined (step S11). If it is determined that it is not the last backward feed, the routine returns to step S6.

On the other hand, when it is determined that it is the last backward feed, the backward feed amount is calculated again with reference to the fraction of the backward feed amount equivalent to the stitch 61 for one stitch P2 (step S12). The following expression <3> is used for the recalculation of the backward feed amount.

Backward feed amount=forward feed amount−backward feed amount×(backward one-set feed frequency−1)     <3>

In the above example, since the forward feed amount is set to 3.9 mm and the backward feed amount is calculated to be 1.9 mm, in a case where the "backward one-set feed frequency" is "2", the backward feed amount is changed from "3.9 mm−1.9 mm×(2−1)" to "2", based on the expression <3>.

If the backward feed amount is recalculated, the routine returns to step S6, and the recalculated backward feed amount is reflected in the formation of the backward straight stitching 6S.

(Operation and Effects)

The sewing machine 1 according to this embodiment is configured to include the feed amount setting part 241 and the feed amount adjustment part 25, as shown in FIG. 1. In the feed amount setting part 241, the forward feed amount equivalent to the stitch 51 for one stitch P1 of the forward straight stitching 5S shown in FIG. 2A is set. Further, in the feed amount setting part 241, the forward feed amount equivalent to the stitch 52 for one stitch P1 of the forward zigzag stitching 5Z shown in FIG. 3B is set.

Here, in the feed amount adjustment part 25, the forward feed amount equivalent to the stitch 51 for one stitch P1 which is set by the feed amount setting part 241 is compared with the maximum backward feed amount for one stitch of the reverse stitching which is determined by the mechanical structure of the feed mechanism 33. Then, in the feed amount adjustment part 25, when the forward feed amount is larger than the maximum backward feed amount (step S4), as shown in FIG. 2A, the total amount of the backward feed amounts equivalent to the stitch 61 for the plurality of stitches P2 of the backward straight stitching 6S is adjusted so as to coincide with the total amount of the forward feed amount equivalent to the stitch 51 for one stitch P1 of the forward straight stitching 5S (step S10). The same adjustment is also performed on the backward feed amount of the backward zigzag stitching 6Z shown in FIG. 3A.

For this reason, as shown in FIG. 2A, it is possible to effectively suppress misalignment between the stitches by causing the stitch 61 of the backward straight stitching 6S to coincide with the stitch 51 of the forward straight stitching 5S. In other words, it is possible to effectively suppress misalignment between the stitches by causing the needle drop position of the stitch 61 of one set Se of the backward straight stitching 6S to coincide with the needle drop position of the stitch 51 of the forward straight stitching 5S. For this reason, in the sewing machine 1, it is possible to improve the appearance of sewing of the reverse stitching.

In this embodiment, the feed amount adjustment part 25 has a configuration of adjusting the total amount of the backward feed amounts equivalent to the stitches 61 for two stitches P2 of the backward straight stitching 6S so as to coincide with the total amount of the forward feed amount equivalent to the stitch 51 for one stitch P1 of the forward straight stitching 5S. In the feed amount adjustment part 25, the total amount of the backward feed amounts equivalent to the stitches 61 for a plurality of stitches P2 may be adjusted so as to coincide with the total amount of the forward feed amounts equivalent to the stitches 51 for one stitch P1 or more.

For example, the total amount of the backward feed amounts equivalent to the stitches 61 for a plurality of, specifically, three, four, or five or more stitches P2 may be adjusted by the feed amount adjustment part 25 so as to coincide with the total amount of the forward feed amounts equivalent to the stitches 51 for two stitches P1 (one stitch P1 or more). Further, the total amount of the forward feed amount may be equivalent to the stitches 51 for three or more stitches P1.

Further, in the sewing machine 1, similarly, as shown in FIG. 3A, since it is possible to cause the stitch 62 of the backward zigzag stitching 6Z to coincide with the stitch 52 of the forward zigzag stitching 5Z, it is possible to effectively suppress misalignment between the stitches. For this reason, in the sewing machine 1, also in the backward zigzag stitching 6Z of the reverse stitching, it is possible to improve the appearance of sewing.

Further, in the sewing machine 1 according to this embodiment, as shown in FIG. 2A, since it is possible to form (sew) the backward straight stitching 6S on the same straight line with respect to the forward straight stitching 5S, it is expected to effectively suppress fraying.

In particular, the backward zigzag stitching 7Z shown in FIG. 3B described as the comparative example causes a deviation in sewing position with respect to the forward zigzag stitching 5Z, and thus there is room for improvement in terms of appearance and fraying. In contrast, in the sewing machine 1 according to this embodiment, as shown in FIG. 3A, it is possible to form the backward zigzag stitching 6Z on the same zigzag with respect to the forward zigzag stitching 5Z, and therefore, the appearance and the fraying can be sufficiently improved.

Further, in the sewing machine 1, the feed amount adjustment part 25 shown in FIG. 1 adjusts the total amount of the backward feed amounts equivalent to the stitches 61 for the plurality of stitches P2 of the backward straight stitching 6S so as to coincide with the forward feed amount equivalent to the stitch 51 for one stitch P1 of the forward straight stitching 5S, as shown in FIG. 2A.

For this reason, the forward feed amount equivalent to the stitch 51 for one stitch P1 is regarded as a basic unit for calculating the total amount of the backward feed amount, and therefore, it is possible to simply and easily perform the calculation of the total amount of the backward feed amount.

The operation and effects are likewise obtained also in the backward zigzag stitching 6Z of the reverse stitching shown in FIG. 3A.

Further, in the sewing machine 1, the feed amount adjustment part 25 shown in FIG. 1 adjusts the respective backward feed amounts in the total amount of the backward feed amounts for a plurality of stitches P2 at equal intervals, as shown in FIG. 2A. That is, in the backward straight stitching 6S, the length and pitch of the stitch 61 for the individual stitch P2 in the total amount of the backward feed amount are all the same.

For this reason, the backward feed amount at equal intervals is regarded as the basic unit for calculating the total amount of the backward feed amount, and therefore, it is possible to simply and easily perform the calculation of the total amount of the backward feed amount.

The operation and effects are likewise obtained also in the backward zigzag stitching 6Z of the reverse stitching shown in FIG. 3A.

Further, as shown in FIG. 1, the sewing machine 1 includes the reverse stitching instruction part 242 in the operation part 24 of the control unit 2. The reverse stitching instruction part 242 gives the instruction on the reverse stitching, based on the user's operation (step S4). Then, at least reverse stitching is performed up to the total amount of the backward feed amount which is adjusted by the feed amount adjustment part 25, in accordance with the instruction from the reverse stitching instruction part 242 (step S9).

For this reason, as shown in FIG. 2A, it is possible to perform the reverse stitching with the stitch 61 of the backward straight stitching 6S coinciding with the stitch 51 of the forward straight stitching 5S, and therefore, it is possible to improve the appearance. Of course, the fraying can also be effectively suppressed.

The operation and effects are likewise obtained also in the backward zigzag stitching 6Z of the reverse stitching shown in FIG. 3A.

Further, as shown in FIG. 4, according to the reverse stitching control program, it is possible to execute the reverse stitching control method of the sewing machine 1, and it is possible to obtain the operation and effects described above.

Second Embodiment

A sewing machine 1 according to a second embodiment of the present invention will be described using FIG. 5. In the description of this embodiment and a third embodiment (described later), the same or substantially the same constituent elements as the constituent elements of the sewing machine 1 according to the first embodiment are denoted by the same reference numerals, and overlapping description is omitted. Further, a reverse stitching control method and a reverse stitching control program according to this embodiment are substantially the same as the reverse stitching control method and the reverse stitching control program according to the first embodiment described above, and therefore, description thereof is omitted here.

(Configuration of Sewing Machine 1)

The sewing machine 1 according to this embodiment has the same constituent elements as those of the sewing machine 1 according to the first embodiment shown in FIG. 1, and the reverse stitching is performed based on substantially the same control method as the reverse stitching control method shown in FIG. 4.

In the sewing machine 1 according to this embodiment, there is a difference in the method of adjusting the backward feed amount by the feed amount adjustment part 25. As shown in FIG. 5, in the feed amount adjustment part 25, the adjustment of the backward feed amount to change the lengths of a stitch 81 for one stitch P4 and a stitch 82 for one stitch P5 in one set Se of a backward straight stitching 8S of the reverse stitching is performed. That is, the feed amount adjustment part 25 performs adjustment to change the backward feed amount equivalent to the stitch 82 for one stitch P5 with respect to the backward feed amount equivalent to the stitch 81 for one stitch P4. Here, the feed amount equivalent to the stitch 81 is set to be larger than feed amount equivalent to the stitch 82.

The respective backward feed amounts are different from each other. However, the total amount of the backward feed amount obtained by adding the backward feed amount equivalent to the stitch 82 for one stitch P5 to the backward feed amount equivalent to the stitch 81 for one stitch P4 coincides with the total amount of the forward feed amount equivalent to the stitch 51 for one stitch P1 of the forward straight stitching 5S. Of course, the magnitudes of both the backward feed amounts may be set in reverse.

In this embodiment, in the feed amount adjustment part 25, the backward feed amounts having two types of magnitudes are set. However, the total amount of the backward feed amount may be adjusted by the backward feed amounts having three or more types of magnitudes. In this case, adjustments in which the respective feed amounts are the same (are at equal intervals) may be performed, adjustment in which the respective feed amounts are not the same (are unequal intervals) may be performed, or adjustment in which some feed amounts are the same and some feed amounts are not the same (are unequal intervals) may be performed.

(Operation and Effects)

In the sewing machine 1 and the reverse stitching control program according to this embodiment, the same operation and effects as the operation and effects which are obtained by the sewing machine 1 and the reverse stitching control program according to the first embodiment described above can be obtained.

Figure 5:
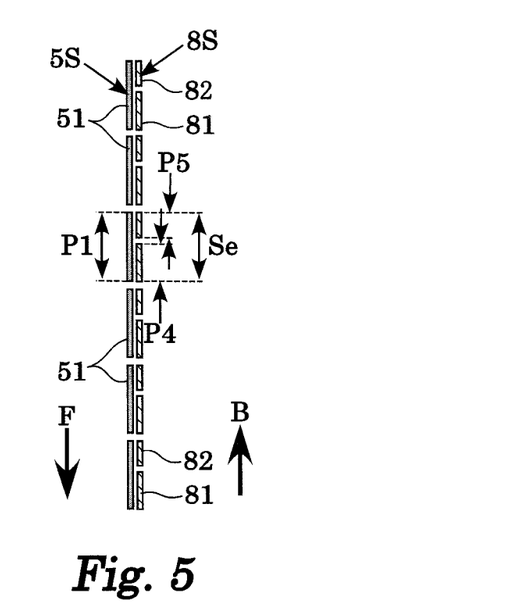
FIG. 5 is a plan view schematically showing stitches of forward straight stitching and stitches of backward straight stitching sewn using a sewing machine according to a second embodiment of the present invention.

Further, in the sewing machine 1, the feed amount adjustment part 25 of the control unit 2 shown in FIG. 1 adjusts the respective backward feed amounts in the total amount of the backward feed amounts for plural stitches of the backward straight stitching 8S of the reverse stitching at unequal intervals, as shown in FIG. 5. That is, in one set Se, the total amount of the backward feed amount is set by the backward feed amount equivalent to the stitch 81 for one stitch P4 and the backward feed amount equivalent to the stitch 82 for one stitch P5 having a different interval from the backward feed amount equivalent to the stitch 81.

For this reason, as shown in FIG. 5, it is possible to effectively suppress the misalignment between stitches by causing the stitch 81 and the stitch 82 of the backward straight stitching 8S to coincide with the stitch 51 of the forward straight stitching 5S, and therefore, in the sewing machine 1, it is possible to improve the appearance of sewing of the reverse stitching. Of course, in the sewing machine 1, fraying can also be effectively suppressed.

In addition, the backward straight stitching 8S of the reverse stitching is configured to include the stitch 81 for one stitch P4 and the stitch 82 for one stitch P5, in which the respective intervals are different from each other, instead of equally spaced monotonic stitches, and therefore, a sewing pattern having an accent is made and the appearance can be further improved.

Although description here is omitted, the same operation and effects can also be obtained in the backward zigzag stitching of the reverse stitching (refer to FIG. 3A).

Third Embodiment

Figure 6:
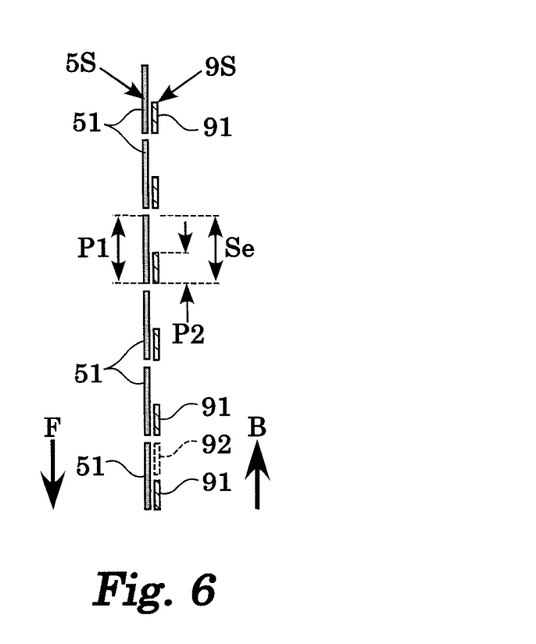
FIG. 6 is a plan view corresponding to FIG. 5, schematically showing stitches of forward straight stitching and stitches of backward straight stitching sewn using a sewing machine according to a third embodiment of the present invention.

A sewing machine 1 according to a third embodiment of the present invention will be described using FIG. 6. Further, a reverse stitching control method and a reverse stitching control program according to this embodiment are substantially the same as the reverse stitching control method and the reverse stitching control program according to the first embodiment described above, and therefore, description thereof is omitted here.

(Configuration of Sewing Machine 1)

The sewing machine 1 according to this embodiment has the same constituent elements as those of the sewing machine 1 according to the first embodiment shown in FIG. 1 described above, and the reverse stitching is performed based on substantially the same control method as the reverse stitching control method shown in FIG. 4.

In the sewing machine 1 according to this embodiment, there is a difference in the method of adjusting the backward feed amount by the feed amount adjustment part 25. As shown in FIG. 6, in the feed amount adjustment part 25, adjustment of the backward feed amount to form only a stitch 91 for one stitch P2 in one set Se of backward straight stitching 9S of the reverse stitching is performed. In the sewing machine 1 according to the first embodiment, in one set Se, the stitch 91 for one stitch P2 and a stitch 92 (shown by a broken line) for one stitch P2 are formed. However, in the sewing machine 1 according to this embodiment, the stitch 92 is omitted. The omission of the stitch 92 is realized by using a method such as needle bar separation in which the movement of an upper shaft (not shown) of the sewing machine 1 and the movement of a needle bar do not interlock with each other (the up-and-down movement of the needle bar is separated from the rotation of the upper shaft), or upper shaft separation in which the movement of the upper shaft and the movement of a lower shaft do not interlock with each other (the movement of the lower shaft is not transmitted to the upper shaft), and not forming the stitch 92 at a timing when the upper shaft and the needle bar or the upper shaft and the lower shaft do not interlock with each other. In this way, only the stitch 91 for one stitch P2 is formed in the backward stitching direction B at an interval equivalent to the stitch 92 for one stitch P2. The stitch 91 which is formed for one stitch P2 and the stitch 92 which is not formed may be disposed at equal intervals or at unequal intervals, as in the embodiments described above, or may be three or more.

(Operation and Effects)

In the sewing machine 1 and the reverse stitching control program according to this embodiment, the same operation and effects as the operation and effects which are obtained by the sewing machine 1 and the reverse stitching control program according to the first embodiment described above can be obtained.

Further, similar to the operation and effects which are obtained by the sewing machine 1 according to the second embodiment, in the backward straight stitching 9S of the reverse stitching, instead of equally spaced monotonic stitches, the stitch 91 for one stitch P2 is not formed at a stitch corresponding to the stitch 92 for one stitch P2, and therefore, a sewing pattern having an accent is made and the appearance can be further improved.

Although the description here is omitted, the same operation and effects can also be obtained in the backward zigzag stitching of the reverse stitching (refer to FIG. 3A).

Other Embodiments

The present invention is not limited to the embodiments described above, and various modifications can be made within a scope which does not depart from the gist of the invention.

For example, in the sewing machines according to the embodiments described above, the backward straight stitching and the backward zigzag stitching of the reverse stitching have been described as an example. However, the present invention may be applied to backward curve stitching of reverse stitching.

REFERENCE SIGNS LIST

1: sewing machine
2: control unit
21: central arithmetic processing unit
22: non-volatile memory
23: volatile memory
24: operation part
241: feed amount setting part
242: reverse stitching instruction part
25: feed amount adjustment part
26: sewing machine motor controller
27: swing and feed motor controller
3: drive unit
31: sewing machine motor
32: swing and feed motor
33: feed mechanism
5S: forward straight stitching
5Z: forward zigzag stitching
51, 52, 61, 62, 81, 82, 91: stitch
6S, 8S, 9S: backward straight stitching
6Z: backward zigzag stitching

What is claimed is:

1. A sewing machine comprising:
    a feed amount setting part which sets a forward feed amount for one stitch of forward stitching; and
    a feed amount adjustment part which compares the forward feed amount which is set by the feed amount setting part with a maximum backward feed amount for one stitch of reverse stitching which is determined by a feed mechanism, and adjusts a total amount of backward feed amounts for plural stitches so as to coincide with a total amount of the forward feed amounts for one stitch or more, when the forward feed amount is larger than the maximum backward feed amount.

2. The sewing machine according to claim 1, wherein the feed amount adjustment part adjusts the total amount of the backward feed amounts for plural stitches so as to coincide with the forward feed amount for one stitch.

3. The sewing machine according to claim 1, wherein the feed amount adjustment part sets respective backward feed amounts in the total amount of the backward feed amounts for plural stitches at equal intervals.

4. The sewing machine according to claim 1, wherein the feed amount adjustment part sets respective backward feed amounts in the total amount of the backward feed amounts for plural stitches at unequal intervals.

5. The sewing machine according to claim 1, wherein the feed amount adjustment part does not form a stitch for a part of a number of stitches in the total amount of the backward feed amounts for plural stitches.

6. The sewing machine according to claim 1, further comprising:
    a reverse stitching instruction part which gives an instruction on the reverse stitching,
    wherein reverse stitching of the total amount of the backward feed amounts for plural stitches which is adjusted in the feed amount adjustment part is performed in accordance with an instruction from the reverse stitching instruction part.

7. A non-transitory computer-readable recording medium, the medium recording a reverse stitching control program for causing a computer to execute a reverse stitching control method for a sewing machine including a feed amount setting part and a feed amount adjustment part,
    wherein the method includes:
    a process in which the feed amount setting part sets a forward feed amount for one stitch of forward stitching; and
    a process in which the feed amount adjustment part compares the forward feed amount which is set by the feed amount setting part with a maximum backward feed amount for one stitch of reverse stitching which is determined by a feed mechanism, and adjusts a total amount of backward feed amounts for plural stitches so as to coincide with a total amount of the forward feed amounts for one stitch or more, when the forward feed amount is larger than the maximum backward feed amount.

* * * * *